United States Patent [19]

Corbett

[11] 4,020,448
[45] Apr. 26, 1977

[54] OSCILLATING CRYSTAL TRANSDUCER SYSTEMS

[76] Inventor: James Patrick Corbett, The Old Manor House, 21, Station Road, Thames Ditton, England

[22] Filed: Aug. 22, 1974

[21] Appl. No.: 499,489

[30] Foreign Application Priority Data

Sept. 17, 1973 United Kingdom ............ 43516/73

[52] U.S. Cl. .............................. 340/8 S; 340/10; 310/9.1
[51] Int. Cl.² ...................................... H04B 13/00
[58] Field of Search ............... 310/9.1; 340/8 S, 10

[56] References Cited

UNITED STATES PATENTS

| 1,912,213 | 5/1933 | Nicolson ........................ 310/9.1 X |
| 2,947,888 | 8/1960 | Harris ............................ 310/9.1 X |
| 2,962,695 | 11/1960 | Harris ............................ 310/9.1 X |
| 3,292,019 | 12/1966 | Hsu et al. ........................ 310/9.1 X |
| 3,370,187 | 2/1968 | Straube ............................. 310/9.1 |
| 3,748,503 | 7/1973 | Cobarg et al. ................. 310/9.1 X |
| 3,748,504 | 7/1973 | Guntersdorfer ............... 310/9.1 X |
| 3,856,995 | 12/1974 | Cragg ............................ 310/9.1 X |

Primary Examiner—Nelson Moskowitz
Attorney, Agent, or Firm—Lowhurst & Aine

[57] ABSTRACT

A force transducer comprises a chamber; two matched plate-like crystals mounted facing each other within the chamber upright with respect to a base member provided within the chamber; electrical means for exciting each of the crystals; and means for transmitting a force to one of the crystals, including a spigot assembly which is mounted within the chamber by means of two spaced apart resilient supports and arranged to bear on one edge of said one crystal so as to produce in response to said force a change of the resonant frequency of that crystal with respect to the other crystal.

6 Claims, 5 Drawing Figures

OSCILLATING CRYSTAL TRANSDUCER SYSTEMS

This invention relates to oscillating crystal transducer systems, and particularly to a force transducer using two crystals mounted in proximity to measure the magnitude of a force (or pressure) or a differential force (or pressure).

According to the present invention, there is provided a force transducer comprising a chamber; two matched plate-like crystals mounted facing each other within the chamber upright with respect to a base member provided within the chamber; electrical means for exciting each of the crystals; and means for transmitting a force to one of the crystals, including a spigot assembly which is mounted within the chamber by means of two spaced apart resilient supports and arranged to bear on one edge of said one crystal so as to produce in response to said force a change of the resonant frequency of that crystal with respect to the other crystal.

In one embodiment of the invention, the other crystal is mounted within the chamber by at least one resilient support which is independent from the two spaced apart resilient supports of said spigot assembly. The said at least one resilient support for the said other crystal may comprise a bimetallic strip.

The spigot assembly may comprise a rod which interconnects the centres of two spaced flexible diaphragms extending across the chamber and consituting said two spaced apart resilient supports, the rod including a projection which is arranged to bear on said one edge of said one crystal so as to transmit thereto a force representative of the difference between two forces, or fluid pressures, to be measured applied to a respective one of said two diaphragms.

Preferably, at least one of the two spaced apart resilient supports of said spigot assembly is arranged to seal the chamber.

Alternatively, the spigot assembly may comprise a rocker supported by a flexible diaphragm and arranged to bear on one edge of both crystals, and means for connecting the rocker to a diaphrarm arrangement which includes at least one additional flexible diaphragm so that the difference between two forces, or fluid pressures, to be measured which are applied to respective sides of the diaphragm arrangement causes the rocker to rock and transmit an increased force to one of the crystals and a correspondingly decreased force to the other crystal to produce a corresponding change in their relative resonant frequencies.

The means for connecting may comprise a spigot arm located in the centre of the additional diaphragm, and extending in an axial direction with respect to the plate-like crystals. Alternatively, the diaphragm arrangement may comprise two additional flexible diaphragms, the two forces or fluid pressures of which the difference is to be measured, being each applied to one side of a respective one of said two additional diaphragms, the means for connecting comprising a spigot member located in the centre of the respective additional diaphragm, each spigot member extending in an axial direction with respect to the plate-like crystals.

Preferably each crystal is mounted between two diametrically opposed seatings, means being provided for moving at least one of the seatings of each crystal in a tangential direction so as to rotate each crystal in a plane normal to its axis. Means may be provided for applying an adjustable pre-compression force to each crystal.

Preferably said electrical means comprises an oscillator circuit arranged to excite the crystals alternatively, the output from the oscillator circuit being fed to a reversible counter arranged to count in one direction when one crystal is excited and in the opposite direction when the other crystal is excited to produce an output indicative of the difference between the resonant frequency of the two crystals. Means may be provided for multiplying the output from the oscillator circuit by a predetermined number before it is fed to the counter.

Reference will hereinafter be made to the accompanying drawings which illustrative various embodiments of the invention by way of example, and of which:

Figure 1:
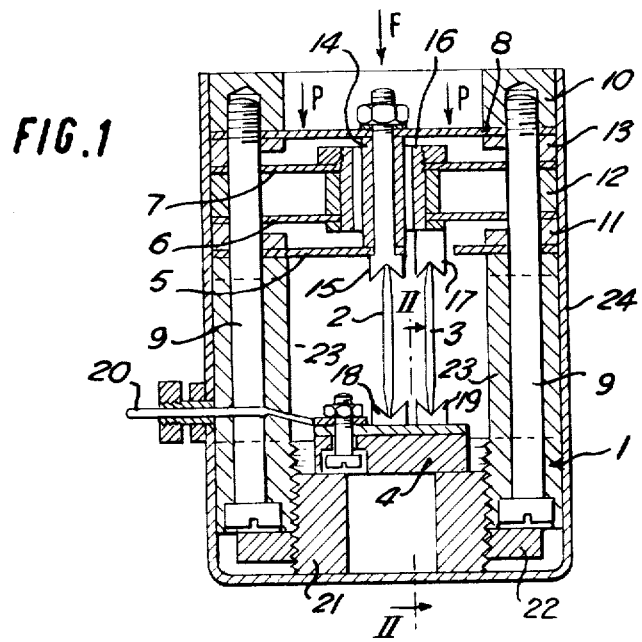
FIG. 1 shows a cross-sectional elevational view of a force transducer.
Figure 2:
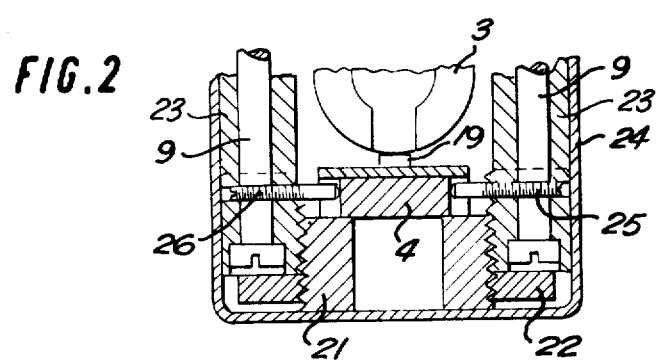
FIG. 2 shows a view of the transducer of FIG. 1 taken on lines II—II.

Referring to FIGS. 1 and 2, a substantially cylindrical housing 1 contains two plate-like, i.e. substantially circular matched crystals 2 and 3 which are mounted side by side facing one another, upright with respect to an insulated base platform 4. Two flat springs 5 and 6, and two diaphragms 7 and 8 are secured across the upper part of the housing by four bolts 9 which are screwed into a ring 10. Spacer rings 11, 12 and 13 separate the springs 5, 6 and flexible diaphragm 7, 8. Spring 5 and diaphragm 8 are attached to a spigot assembly 14, through which a force or pressure to be measured can be applied to crystal 2 via an upper vee-shaped seating 15. Spring 6 and diaphragm 7 are attached to a ring 16 which bears on the crystal 3 via an upper vee-shaped seating 17.

At their lower edges, the crystals 2 and 3 are mounted on respective lower vee-shaped seatings 18 and 19, disposed on the platform 4. An electrical connection 20 to crystal 2 via seating 18 is shown in FIG. 1. Another similar connection, which is not shown, is provided for the other crystal 3 via seating 19. The crystals 2 and 3 are firmly secured in position by pre-compression forces exerted on the base platform 4 via a single base screw 21 which pushes each crystal upwards againt the downward force exerted by the respective springs 5 and 6. The box screw 21 is secured by a lock/nut 22. If necessary, two separate base screws may be provided, one for each crystal, so that the pre-compression forces for each may be adjusted independently to correct for minor residual temperature coefficient effects on each crytal.

The purpose of mounting the two crystals in close proximity with each other, under substantially the same environmental conditions, enables the frequency of crystal 3 to be employed as a reference frequency for the frequency of crystal 2, which sustains the force to be measured via spigot assembly 14. The crystals are maintained in oscillation by a single oscillator circuit, as hereinafter described with reference to FIG. 5. The oscillator circuit may be located in a capsule adjacent the transducer housing 1, or at a position up to several feet from it. For some purposes two separate oscillator circuits may be used, the outputs of which are arranged to beat together. The transducer is arranged to measure either a force F applied direct to the spigot assembly 14, or a fluid pressure P which can be applied over the upper surface of diaphragm 8 and thus transmitted to the spigot assembly 14.

It will be appreciated that springs 5 and 6 may be replaced by flexible diaphragms, and/or diaphragm 7 may be replaced by a flat spring. The double resilient support for the spigot assembly 14 and ring 16 tends to maintain the correct alignment of the line of action of the forces acting on each crystal through the centre of the active area thereof. In order that compensation may be made for temperature change effects on the transducer, spring 6 may be a bimetallic strip which is deformed as the temperature changes to vary the pre-compression force on crystal 3 accordingly. Alternatively, spring 5 or diaphragm 7 may be replaced by a bimetallic strip. The deflection of the bimetallic strip may be adjustable by means of a screw mechanism (not shown).

The housing 1 is provided with relatively large access openings between pillars 23 which house the bolts 9, through which openings the crystals 2 and 3 may pass during the assembly of the transducer before a cylindrical cover 24 is fitted around the housing 1. The cover 24 may be welded or brazed at suitable points to permit the transducer to be hermetically sealed and possibly evacuated also, since evacuation tends to increase the Q factor of the transducer, thus reducing the random frequency drift and increasing the accuracy of the transducer.

The crystals are preferably arranged to oscillate at frequencies in the megaherz range from the frequencies of the crystals are conveniently spaced by about 0.2%. They are preferably AT cut and selected to have temperature/frequency performances which are as nearly matched as possible. This matching of the crystals either obviates any need for periodically relieving the force applied, or reduces the frequency at which relieving of the applied force is required to achieve the accuracy desired.

FIG. 2 shows an elevation view of the lower part of the transducer of FIG. 1 and illustrates the means by which either or both crystals can be rotated by a small angle to preset the temperature sensitivity of the device. Two small screws 25 and 26 are arranged to move the platform 4 on which each crystal sits by a small distance. They also have the effect, when both are firmly tightened in opposing directions, of locking the platform in position so that environmental accelerations of the transducer will not affect the accuracy. If necessary, two small screws may be provided for each crystal so that the crystals may be rotated independently. The adjustment described will move the crystal off the centre of the instrument by a very small distance but this will not normally create a measurable error; however it will be appreciated that an analogous adjustment could, if desired, be arranged to adjust movable upper seatings, but the movable upper seating could not be finally tightened to lock the seatings in position as this would interfere with normal operation of the transducer. To avoid errors due to environmental accelerations such movable upper seatings must necessarily be very small.

Adjustment of the seating position of the force sensing crystal 2 is undertaken to cause the transducer to have a scale factor (i.e., output vs force) which is independent of environmental temperature change. Adjustment of the seating position of the reference crystal 3 enables zero drift of the output (difference) frequency to be prevented due to differential force (with environmental temperature change) brought about by different expansion rates between the quartz of the reference crystal and the material of the transducer housing. The reference crystal 3 is thus not set on an axis which is 40° with reference to the X-axis of the crystal (as is the case with the force sensing crystal) but is set in a rotational position which ensures that the frequency vs. environmental temperature behavior of each crystal is identically matched.

Figure 3:
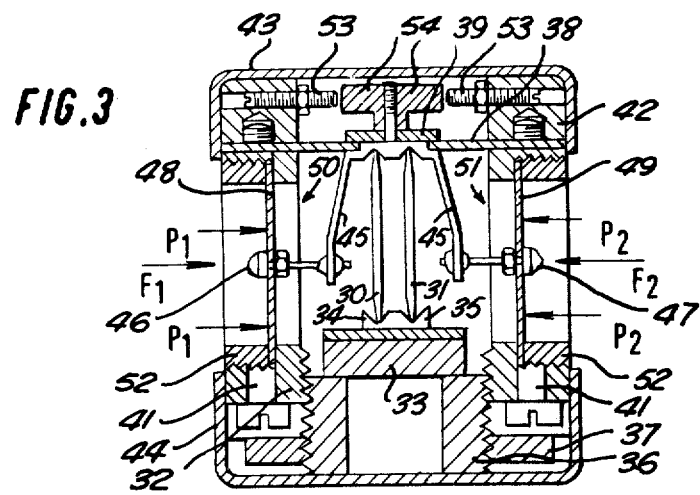
FIG. 3 shows a cross-sectional elevational view of a second embodiment of a force transducer.

FIG. 3 shows a transducer, containing a pair of matched crystals 30, 31, which is arranged to measure the difference between two applied forces $F_1$ and $F_2$, or two applied pressure $P_1$ and $P_2$, by increasing the force transmitted to one crystal and correspondingly decreasing the force transmitted to the other crystal. The crystals are matched in the same fashion as crystals 2 and 3 described for the first embodiment, and are mounted within a cylindrical housing 32 under substantially identical conditions so that any environmental changes such as temperature, securing forces etc on each crystal will not materially affect the frequency difference output of the transducer.

As in the previous embodiment, the two circular crystals are mounted side by side with their broad faces adjacent, upright with respect to an insulated base platform 33, and vee-shaped lower seatings 34 and 35. Similar provision is made, but is not shown, for adjusting the lower seating position of each crystal. Electrical connections (not shown) are made to each crystal. A pre-compression force is applied to each crystal via a base screw 36 secured within the housing 32 by a locknut 37. The crystals are thus urged upwards against the action of a single flexible diaphragm or flat spring 38 to which is attached a seating component 39 including a vee-shaped upper seating for each crystal. The diaphragm 38 extends across the upper end of the housing 32 and is secured thereto by bolts 41 which are screwed into a retaining ring 42. Cover caps 43 and 44 are fitted over each end of the housing and welded or brazed thereto to seal the housing hermetically.

A spigot assembly comprises a spigot arm 45 attached to each side of the seating component 39, the end of each spigot arm 45 being connected to a respective spigot member 46, 47 located at the centre of a respective diaphragm 48, 49. The diaphragms each extend across a respective access opening 50, 51 in the housing 32 and are secured thereto by retaining rings 52. Thus each spigot assembly is mounted within the housing by the diaphragm 38 and the respective diaphragm 48, 49.

When forces $F_1$, $F_2$ are applied to the spigot members 46, 47 or fluid pressures $P_1$, $P_2$ are applied over the outer surfaces of flexible diaphragms 48, 49, the difference between $F_1$ and $F_2$, or between $P_1$ and $P_2$, causes the seating component 39 to rock due to the moment effect produced by arms 45. The resultant bending of diaphragm 38 causes the precompression force applied to one crystal to be increased and that applied to the other crystal to be correspondingly decreased, producing a difference in the frequencies of oscillation of each crystal indicative of the magnitude of the difference between $F_1$ and $F_2$ or $P_1$ and $P_2$. Stops 53 in the form of screws protruding through the retaining ring 42 prevent the complete removal of the pre-compression force on either crystal under overload conditions. A T-shaped member 54 which moves between the stops 53 as the seating component 39 rocks may incorporate counterweights to prevent horizontal acceleration of the complete transducer from producing undesirable errors.

This arrangement ensures compensating behavior of the crystals since they are mounted close together and the pre-compression force to each is applied by the single diaphragm 38. Thus if, for example, the transducer expands or contracts due to a change in the environmental conditions, the single diaphragm 38 acting on both crystals will have an equal effect in increasing or decreasing the force applied to each crystal, eliminating small errors which may occur if one diaphragm for each crystal is used, as is the case in the embodiment shown in FIGS. 1 and 2.

If desired, $F_1$ (or $P_1$) or $F_2$ (or $P_2$) may be zero, so that the transducer is used to measure the magnitude of one force (or pressure) only, rather than a differential force (pressure).

In some applications, usually where fluid pressure differences only are to be measured, only one of the diaphragms 48 or 49 is provided in addition to diaphragm 38. The two pressures $P_1$ and $P_2$ are therefore applied to a respective side of the diaphragm 48 or 49, the fluid at pressure $P_2$, say, where diaphragm 49 is omitted, surrounding the crystals. In a modified form of the transducer shown in FIG. 3, the two diaphragms 48 and 49, or the single diaphragm 48 or 49, may be located above the diaphragm 38. This modification is particularly suitable where only one diaphragm 48, say, is provided since the fluid at pressure $P_2$ will not surround the crystals and cannot therefore exert a lifting pressure on diaphragm 38 which may in some cases unseat the crystals from the seating component 39.

Figure 4:
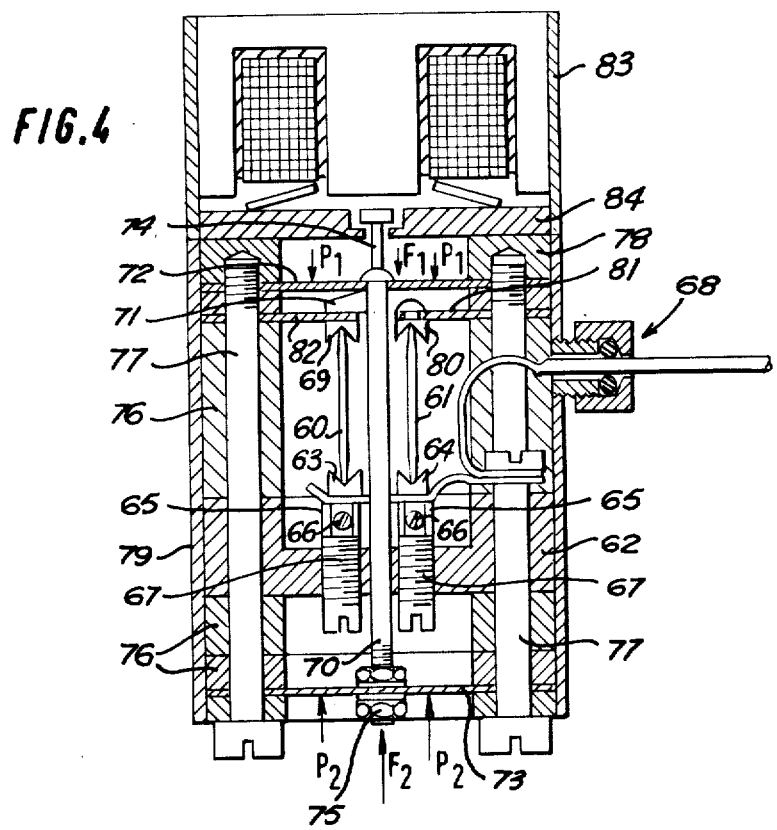
FIG. 4 shows a cross-sectional elevational view of a third embodiment of a force transducer.

FIG. 4 illustrates another embodiment of a transducer containing two matched crystals, arranged to measure the difference between two forces $F_1$, $F_2$ or two fluid pressures $P_1$, $P_2$, introduced by any convenient means to two flexible diaphragms 72 and 73. In this case, the difference is applied to only one of the crystals, the second being used as a reference. The crystals are arranged to oscillate at about 5 megaherz, their frequencies being spaced by for example 20 kiloherz. The two circular crystals 60, 61 are mounted upright with respect to a frame 62, side by side with their broad faces adjacent on respective lower vee-shaped seatings 63, 64. Each lower seating is fitted on a base platform member 65, of which the position is adjustable in a lateral direction parallel to the broad faces of the associated crystal by means of screws 66. This adjustment enables the associated crystal to be rotated about its own axis to set the force/frequency/temperature coefficient of the transducer. The screws 66 also serve to clamp each base platform member 65 in position once the necessary adjustment has been made. Each base platform member 65 is movable in a longitudinal direction along the housing by means of a setting screw 67 to apply a pre-compression force to the associated crystal to clamp it firmly in position. An electrical connection 68, of which only one is shown, is provided for each lower seating 63, 64.

At its upper end, crystal 60 can be subjected via its upper vee-shaped seating 69 to a differential force which is transmitted by a rod 70 via a projection 71 which bears a seating 69. The rod connects the two pressure diaphragm 72, 73 at either end of the transducer. Thus the resulting frequency change of the force-responsive crystal 60 is a direct measure of the difference between fluid pressures $P_1$ and $P_2$ applied over diaphragms 72 and 73 respectively, or between forces $F_1$ and $F_2$ applied to spigot members 74 and 75 in the centre of diaphragms 72, 73 respectively.

The assembly is completed by spacing collars 76 and clamped together by bolts 77 which are screwed into a retaining ring 78. The purpose of this construction is to permit access to the inside of the assembly for mounting of the crystals. A cylindrical cover 79 is finally fitted over the assembly and welded or brazed at suitable material faces to permit the transducer, if desired, to be hermetically sealed, or, if desired, to be evacuated to increase the Q factor of the crystals thereby reducing random frequency excursions and increasing the accuracy of the transducer. The crystal 61 is mounted at its upper end by an upper vee-shaped seating 80, to which is attached a flat spring 81, used in the application of the pre-compression force on crystal 61.

It is assumed that, in normal use, pressure $P_1$, or force $F_1$, will always be greater than pressure $P_2$, or force $F_2$ respectively so that the crystal seating 69 will not become disengaged from the projection 71 on rod 70. However, under exceptional conditions, $P_2$ might, inadvertently, become greater than $P_1$ thereby allowing crystal 60 to move out of its required position. To avoid this, a piece of clock-spring material may be placed between seating 69 and the projection 71 on rod 70. In its free condition the clock-spring material is curved but becomes completely flat under normal preset load caused by the associated screw 67, and therefore it does not affect the normal operation of the transducer. In general, the preset force produced by adjustment of the associated screw 67 is arranged to be greater than the normal maximum value of force exerted on diaphragm 73 by pressure $P_2$ or force $F_2$.

For yet higher accuracy of measurement, the upper seating 69 may be supported by spring tongue 82 which projects from the side of the assembly. In this case, a solenoid 83 may be arranged to lift the applied differential force or pressure completely off the tongue 82 by means of a disc-shaped armature 84, thus enabling the zero-load frequency of the crystal 60 to be established periodically.

Figure 5:
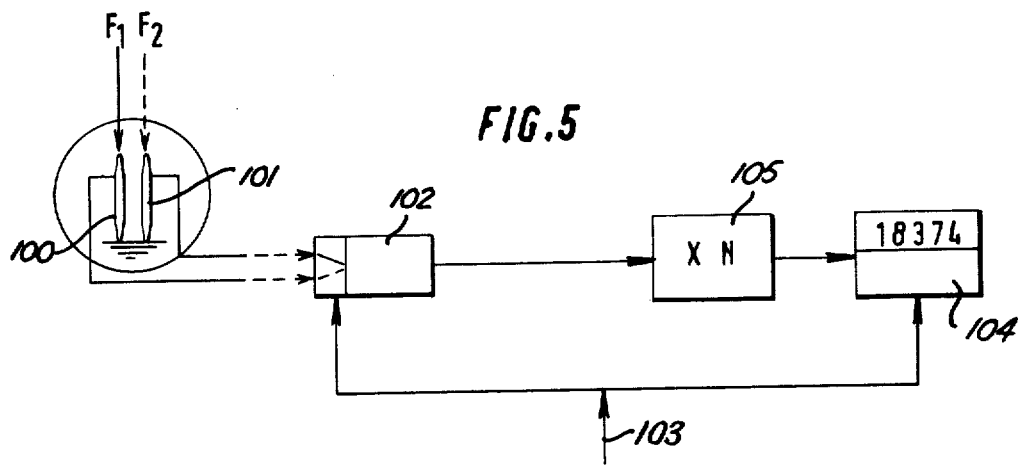
FIG. 5 illustrates diagrammatically a suitable electrical circuit for use in evaluating and displaying the electrical output of the transducers of FIGS. 1, 3 or 4.

FIG. 5 illustrates by way of example one embodiment of an electric circuit suitable for evaluating the electrical output from the crystals and displaying the difference between the force applied to each. In the case of the transducers shown in FIGS. 1 and 4, the force applied externally to the second reference crystal is taken to be zero, the pre-compression force applied being common to both crystals.

In FIG. 5, a force $F_1$ is assumed to be applied externally to one crystal 100, and a force $F_2$ to the second crystal 101. As indicated above, the external force $F_2$ is occasionally taken to be zero. The electrical connections to each crystal are fed to a single oscillator circuit 102. To further eliminate any relatively frequency drift, the crystals can be alternatively excited by the oscillator circuit 102 at times dictated by a timing signal in a line 103 in such a way that interrogation of one crystal causes a frequency-differencing-counter 104 to count in an up direction, and interrogation of the other crystal causes the counter 104 to count in a down direction, thus leaving a number which is proportional to the frequency difference between the two crystals. If the crystals are not of identical frequency in their unloaded conditions, it may be necessary to enter a preset number into the counter at the outset of each measurement sequence, in order to re-zero the counter whenever the transducer is not loaded. The said preset number is that number which would have been shown at the end of a measurement sequence had the counter not been thus re-zeroed. The signals from the crystals are multiplied by a factor N in a circuit 105 before being fed to the counter 104.

I claim:

1. A force transducer comprising:
   a chamber;
   a base member within said chamber;
   two matched plate-like piezoelectric crystals dispoed within said chamber upright with respect to said base member;
   a mounting assembly for said crystals, said mounting assembly consisting of two similar pairs of seats, each pair having a first seat which is supported on said base member and engages an edge portion of a respective one of said crystals and a second seat which engages the diametrically opposite edge portion of the respective crystal;
   electrical means for exciting each of said crystals into oscillations;
   a spigot extending within said chamber for transmitting a force to be measured to one of said crystals via said second set of the pair of seats which supports said one crystal;
   two spaced apart resilient supports which extend from said spigot to the walls of said chamber; and
   at least one further resilient support which is independent of the first-mentioned two spaced apart resilient supports, said further resilient support extending into said chamber from a wall thereof and being connected to said second seat of the pair of seats which supports said other crystal.

2. A force transducer as claimed in claim 1, in which said at least one further resilient support for the said other crystal comprises a bimetallic strip.

3. A force transducer as claimed in claim 1, in which at least one of the two spaced apart resilient supports of said spigot is arranged to seal the chamber.

4. A force member as claimed in claim 1, in which each crystal is mounted between two diametrically opposed seatings, means being provided for moving at least one of the seatings of each crystal in a tangential direction so as to rotate each crystal in a plane normal to its axis.

5. A force transducer as claimed in claim 1, in which means are provided for applying an adjustable pre-compression force to each crystal.

6. A force transducer as claimed in claim 1, in which said electrical means comprises an oscillator circuit arranged to excite the crystals alternately, the output from the oscillator circuit being fed to a reversible counter arranged to count in one direction when one crystal is excited and in the opposite direction when the other crystal is excited to produce an output indicative of the difference between the resonant frequency of the two crystals.

* * * * *